United States Patent [19]

Johnson et al.

[11] Patent Number: 5,010,547
[45] Date of Patent: Apr. 23, 1991

[54] MULTIPLE MESSAGING USING A SINGLE SELECTIVE CALL ADDRESS

[75] Inventors: Richard E. Johnson, Lake Worth; Amy R. Kabcenell, Highland Beach; Joan S. DeLuca, Boca Raton, all of Fla.

[73] Assignee: Motorola, Inc., Schaumburg, Ill.

[21] Appl. No.: 377,649

[22] Filed: Jul. 10, 1989

[51] Int. Cl.⁵ .............................................. H04J 3/26
[52] U.S. Cl. ............................... 370/94.1; 340/825.44
[58] Field of Search ........................... 370/94.1, 95.1; 340/825.44, 825.52, 825.07

[56] References Cited

U.S. PATENT DOCUMENTS

| 4,706,272 | 11/1987 | Nishimura et al. | 340/825.44 |
| 4,878,051 | 10/1989 | Andros et al. | 340/825.44 |
| 4,910,510 | 3/1990 | Davis et al. | 340/825.44 |

Primary Examiner—Douglas W. Olms
Assistant Examiner—Melvin Marcelo
Attorney, Agent, or Firm—William E. Koch; Vincent B. Ingrassia; Gregg E. Rasor

[57] ABSTRACT

A method is described for transmitting a plurality of messages within a single transmission having one address to a selective call receiver. An identification packet preceding each message determines the slot in which the message is stored. The packet may also move a message from one slot to another.

18 Claims, 3 Drawing Sheets 5,010,547

MULTIPLE MESSAGING USING A SINGLE SELECTIVE CALL ADDRESS

FIELD OF THE INVENTION

This invention relates in general to selective call systems and more particularly to the disposition of one or more messages in response to related identification packets using a single selective call address.

BACKGROUND OF THE INVENTION

Selective call systems are characterized by the transmission of data to one or more selective call receivers which respond by sensibly alerting and presenting data to the user. Each selective call receiver has one or more unique address codes, hereafter referred to as an address, assigned to identify a specific selective call receiver. When an address is transmitted via a modulated signal, the selective call receiver decodes the address. If the address matches a predetermined address associated with the selective call receiver, a sensible alert is activated and data associated with the address is presented to the user. In the case where the address does not match a predetermined address associated with the selective call receiver, the selective call receiver ignores the data associated with the address and begins searching for the next transmitted address. In order to receive more than one message using the aforementioned selective call coding format, multiple transmissions, each including an address, data, and other system overhead, must be sent by the transmitter, thus consuming system time and decreasing the overall efficiency.

There is a limitation to the number of functions which can be represented by each address. For example, separate addresses are required for numeric, alphanumeric, tone only, and tone and voice functions in previously known selective call receivers. Further restrictions are imposed in current systems by the automatic placement of new information in the next available information storage memory, hereafter referred to as a slot, as determined by the receiving device, destroying the existing contents of the slot.

Thus, what is needed is a method for, with a single transmission, sending information comprised of a single selective call address and one or more identification packets related to one or more messages, receiving the single transmission and selecting a selective call receiver, parsing one or more identification packets from the information, and determining the slot and storage mode for each message in response to said identification packets.

SUMMARY OF THE INVENTION

Accordingly, it is an object of the present invention to provide for multiple selective call messaging capability on a selected selective call receiver using a single transmission and a single selective call address.

Another object of the invention is to provide control over the slot in which a message is stored as well as the storage mode used for placement of a message in a slot.

In carrying out the above and other objects of the invention in one form, there is provided a method for receiving information by a selected selective call receiver from a single transmission, parsing at least one identification packet from said information, and storing a message associated with said at least one identification packet.

The above and other objects, features, and advantages of the present invention will be better understood from the following detailed description taken in conjunction with the accompanying drawings.

DETAILED DESCRIPTION OF THE INVENTION

Figure 1:
FIG. 1 is a code diagram of the prior art showing a selective call addressing scheme including two messages in two different transmissions.

Referring to FIG. 1, the code diagram shows an example of sending two messages to a selective call receiver using a selective call addressing scheme employed by the prior art. Note that the address 1 is first sent to select the selective call receiver and to enable the reception of a message 2. In order to send another message to the selective call receiver, the system must re-address the selective call receiver by sending the address 3 and then message 4. In existing systems there can be a significant time lag between the reception of a first message 2 and a second message 4 caused by the queuing of other selective call messages before the address 3 and message 4 are broadcast by the system.

Figure 2:
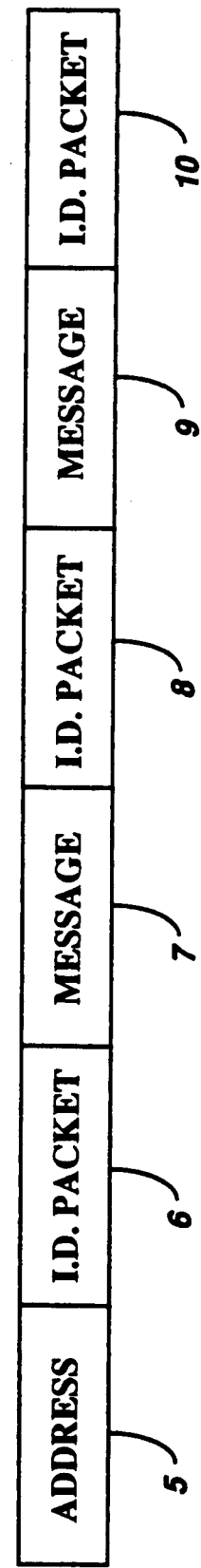
FIG. 2 is a code diagram of the preferred embodiment of the present invention showing a multiple message selective call addressing scheme including three identification packets and two messages.

Referring to FIG. 2, the code diagram shows an example of a multiple message transmission including a single address 5, three identification packets 6, 8, 10, and two messages 7, 9. The selective call receiver is selected by receiving a selective call address 5 and matching the address 5 to a predetermined address corresponding to the selective call receiver. When the selective call receiver is selected, information following the address 5 is parsed by searching for and separating the identification packets 6, 8, 10, and messages 7, 9. When messages 7, 9 are found following identification packets 6, 8, respectively, the messages are stored in a slot according to the storage mode denoted by the immediately preceding identification packet. The identification packets represent the storage mode and slot number for an existing or new message, and the message data type. Storage modes may comprise writing, appending, and copying messages to slots. Message data types may comprise numeric, alphanumeric, tone only, and tone and voice data in either a quantized or continuous format. An identification packet 10 that is not followed by a message in the transmission is used to copy a message which already exists in the selective call receiver from a first to a second slot.

Figure 3:
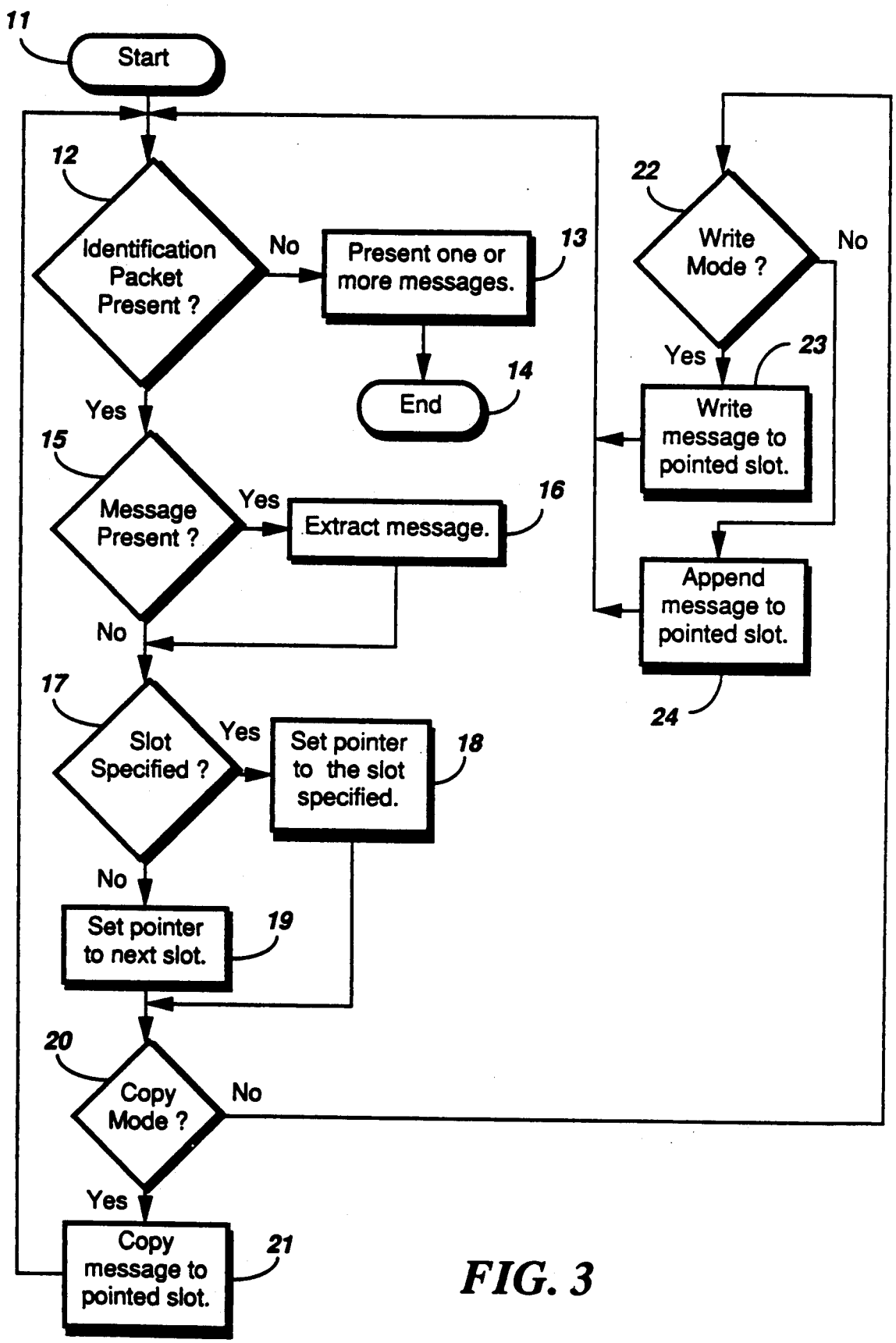
FIG. 3 is a flow diagram of the steps used in accordance with the preferred embodiment of the present invention.

Referring to FIG. 3, the flow diagram shows the preferred procedure for receiving and storing of one or more messages in a selected selective call receiver. The flow begins 11 after the receiver has been selected by matching the address within the transmitted information. If no identification packets are present 12, the selective call receiver defaults to receiving and presenting 13 a single message. After presenting the message 13, the multiple message search is terminated 14 and the selective call receiver begins searching transmissions for the next matching address. When an identification packet is present 12, the information immediately following the identification packet is checked for the presence of a message. If a message is present 15 it is extracted 16 from the information. After checking the information for a message, the present identification packet is tested 17 to see if a slot has been specified. If a slot has been specified, the pointer is set 18. This pointer is used to direct the message associated with the present identification packet to a specific slot. If no slot has been specified, the selective call receiver sets the pointer to the next available slot 19. The identification packet is now tested for the copy mode 20. If the copy mode is selected, an existing message is copied from the slot associated with the copy mode identification packet to a slot specified by the pointer 21. After the message is copied, the remaining information is searched until all identification packets and messages are extracted. If the copy mode is not selected, the identification packet is tested for the write mode 22. When the write mode is selected, the message associated with the present identification packet is written into a slot specified by the pointer 23. If the write mode is not selected, the message associated with the present identification packet is appended to the contents of an existing message in a slot specified by the pointer 24. After the message is written or appended to the slot 23, the remaining information is searched until all identification packets and messages are extracted. When all identification packets and associated messages have been extracted the selective call receiver presents the messages to the user 13. After presenting the messages 13, the multiple message search is terminated 14 and the selective call receiver begins searching transmissions for the next matching address.

Figure 4:
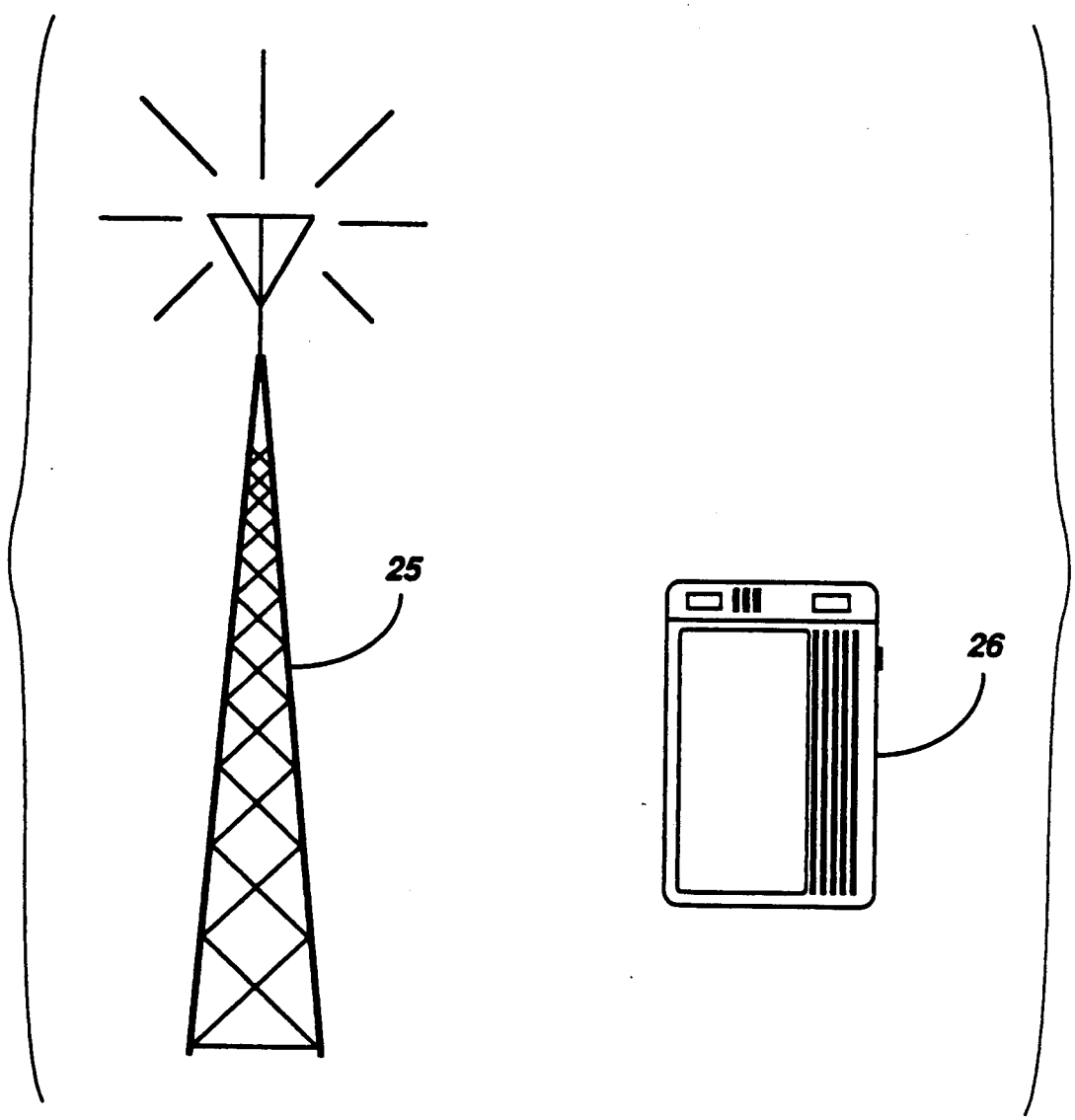
FIG. 4 is a diagram of the preferred embodiment of a system which implements the present invention.

Referring to FIG. 4, the diagram shows the preferred embodiment of a system which implements the present invention. The information is broadcast from the transmitter 25 to the selective call receiver 26. When selected, the selective call receiver 26 parses the received information into at least one identification packet, storing one of at least one message associated with each identification packet. After all information associated with the active selective call address has been received and decoded, the selective call receiver sensibly alerts and at least one message is presented to the user.

By now it should be appreciated that there has been provided a method using a single transmission for sending information comprised of a single selective call address and one or more identification packets related to one or more messages, receiving the single transmission and selecting a selective call receiver, parsing one or more identification packets from the information, and determining the slot and storage mode for each message in response to the identification packets.

We claim:

1. A method for receiving information by a selected selective call receiver from a single transmission comprising the steps of:
   locating message storage instructions in said information; and
   storing a message associated with said message storage instructions by appending said message to existing data in a specific memory area in accordance with said message storage instructions.

2. The method according to claim 1 wherein said locating step comprises the steps of:
   searching said information for said at least one identification packet; and
   separating said at least one identification packet from said information.

3. A method for receiving information by a selected selective call receiver from a single transmission comprising the steps of:
   locating message storage instructions in said information; and
   storing a message associated with said message storage instructions by copying said message from a first memory area to a second memory area in accordance with said message storage instructions.

4. The method according to claim 1, which includes the transmitter step of:
   transmitting a selective call address within said information and at least message storage instructions associated with one of at least one message, said message storage instructions denoting the procedure for determining the disposition of said at least one message.

5. The method according to claim 3 which includes the transmitter step of transmitting a selective call address within said information and at least message storage instructions associated with one of at least one message, said message storage instructions denoting the procedure for determining the disposition of said at least one message.

6. A method for providing information comprising the steps of:
   transmitting a selective call address within said information and message storage instructions associated with one of at least one message;
   receiving said information with a selective call receiver;
   determining the selection of said selective call receiver by matching said selective call address with a predetermined address corresponding to said selective call receiver;
   locating said message storage instructions in said information; and
   storing said at least one message by appending the message to existing data in a specific memory area in accordance with said message storage instructions.

7. The method according to claim 6 wherein said locating step comprises the steps of:
   searching said information for said at least one identification packet; and
   separating said at least one identification packet from said information.

8. The method according to claim 6 wherein said transmitting step comprises the step of broadcasting said information for reception by said selective call receiver.

9. A method for providing information comprising the steps of:
   transmitting a selective call address within said information and message storage instructions associated with one of at least one message;
   receiving said information with a selective call receiver;
   determining the selection of said selective call receiver by matching said selective call address with a predetermined address corresponding to said selective call receiver;
   locating said message storage instructions in said information; and
   storing said at least one message by copying the message from a first memory area to a second memory area in accordance with said message storage instructions.

10. A system for providing information comprising:
means for transmitting a selective call address within said information and message storage instructions associated with one of at least one message;
means for receiving said information with a selective call receiver;
means for determining the selection of said selective call receiver by matching said selective call address with a predetermined address corresponding to said selective call receiver;
means for locating said message storage instructions in said information; and
means for storing said at least one message by appending the message to existing data in a specific memory area in accordance with said message storage instructions.

11. The system according to claim 10 wherein said means for transmitting comprises an information transmitter.

12. The system according to claim 10 wherein said means for receiving comprises a selective call information receiver.

13. The system according to claim 10 wherein said means for determining the selection of said selective call receiver comprises a decoder for matching said selective call address included within said information to said predetermined address corresponding to said selective call receiver.

14. The system according to claim 10 wherein said means for locating comprises:
means for searching said information for said at least one identification packet; and
means for separating said at least one identification packet from said information.

15. A system for providing information comprising:
means for transmitting a selective call address within said information and message storage instructions associated with one of at least one message;
means for receiving said information with a selective call receiver;
means for determining the selection of said selective call receiver by matching said selective call address with a predetermined address corresponding to said selective call receiver; and
means for storing said at least one message by copying the message from a first memory area to a second memory area in accordance with said message storage instructions.

16. The method according to claim 3 wherein said locating step comprises the steps of:
searching said information for said message storage instructions; and
separating said message storage instructions from said information.

17. The method according to claim 9 wherein said locating step comprises the steps of:
searching said information for said message storage instructions; and
separating said message storage instructions from said information.

18. The system according to claim 15 wherein said means for locating comprises:
means for searching said information for said message storage instructions; and
means for separating said message storage instructions from said information.

* * * * *